March 30, 1948. S. T. PULLIAM 2,438,646
EYE SPECULUM
Filed Nov. 6, 1945

INVENTOR..
Seeley T. Pulliam
BY E. V. Hardway
attorney.

Patented Mar. 30, 1948

2,438,646

UNITED STATES PATENT OFFICE 2,438,646

EYE SPECULUM

Seeley T. Pulliam, Houston, Tex.

Application November 6, 1945, Serial No. 626,957

4 Claims. (Cl. 128—20)

This invention relates to an eye speculum.

An object of the invention is to provide an appliance of the character described adapted to be fitted to the face of a patient and having means thereon for holding it in place as well as means adapted to engage either eye lid and move the lid and hold it spaced from the eye ball; the speculum is particularly useful in eye operations where the eye ball must be relieved of all pressure either from the lids or from the instrument as, for example, in cataract, iridectomy and like operations.

Another object of the invention is to provide a speculum of the character described which, in use, may be applied to either upper or lower lid separately or to both lids simultaneously and whereby the lid, or lids, may be held spaced from the corresponding eye ball as well as retracted.

It is a further object of the invention to provide a speculum of the character described which is of such construction that the lids will be relieved of supporting any of the load of the instrument.

A further object of the invention resides in the provision of an eye lid speculum wherein the means which engage the eye lids are adjustable in all necessary directions so that the lids can be retracted, raised from the eye ball and tilted in any direction and to any degree.

It is a still further object of the invention to provide a speculum of the character described which includes a face mask, or frame, which is adjustable to different face contours and sizes.

The invention also includes novel means for mounting the eye lid retractor whereby it may be adjusted into any desirable position and while this retractor mounting has been specially designed for use in a speculum of the character described it is also capable of other, and general, uses.

With the above and other objects in view the invention has particular relation to certain novel features of construction, arrangement of parts and use, an example of which is given in this specification and illustrated in the accompanying drawings, wherein.

Figure 1:
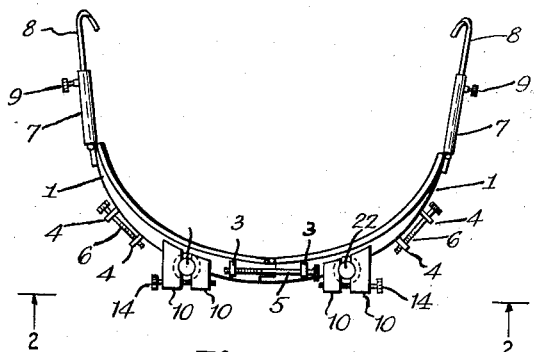
Figure 1 is a top plan view of the speculum.
Figure 2:
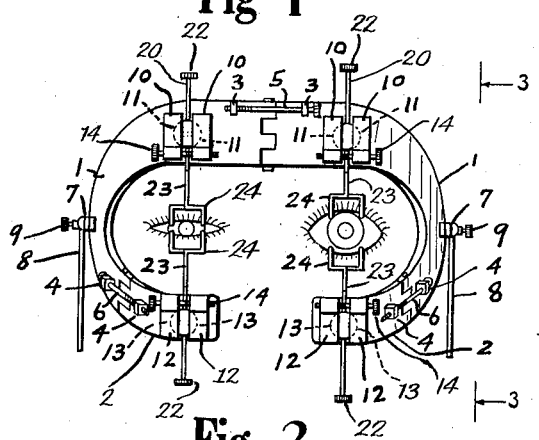
Figure 2 is a front elevation as viewed on the line 2—2 of Figure 1.
Figure 3:
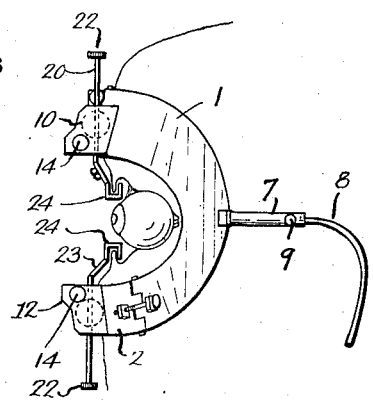
Figure 3 is a side view as viewed on the line 3—3 of Figure 2.
Figures 4, 5:
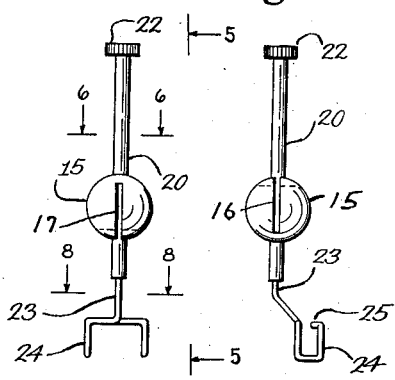
Figure 4 is an elevation view of a lid retractor and mounting therefor.
Figure 5 is side view thereof as viewed on the line 5—5 of Figure 4.

Referring now more particularly to the drawings, wherein like numerals of reference designate the same parts in each of the figures, the numerals 1, 1 designate the side pieces of the face mask which are hinged together at the center of the mask to move on a vertical axis. These side pieces are arcuate in shape, as more clearly shown in Figure 3, and are also curved to conform to the contour of the face, as more accurately shown in Figure 1. Therefore, when applied to the face the top portion of the mask will fit across the forehead and the side pieces will surround the respective eyes with the free ends 2, 2 of the mask resting against the cheeks of the patient. These free ends are also hinged on approximately vertical axes, as shown in Figures 2 and 3.

The connected ends of the side pieces 1, 1 are provided with outstanding lugs 3, 3 and the adjacent portions of the hinged side pieces have the outstanding lugs 4, 4. Fitted through one lug 3 and threaded into the other lug 3 is the rod 5 and fitted through one of the lugs 4 of each pair and threaded through the other lug 4 of said pair are the rods 6, 6. These rods 5 and 6 do not rebound but when bent to any degree they will remain in that shape.

Connected to the side pieces 1, 1, on each side, are the bearing sleeves 7, 7 into which the forward ends of the ear bows 8, 8 are fitted and in which said bows are secured by the set screws 9, 9 so that the ear bows may be readily adjusted to the particular patient and there secured. The hinged construction of the face mask, or frame, will allow it to be adjusted to conform to the size and contour of the face of the particular patient to which it is applied and the rods 5 and 6 will hold it in said adjusted position.

Fastened to the side pieces 1, 1 on opposite sides of the hinge connecting them there are the pairs of clamps 10, 10. The clamps of each pair are spaced apart and have confronting sockets 11, 11, each socket being of the shape of a spherical segment and on the hinged free ends 2 are similar pairs of clamps 12, 12, the clamps of each pair being spaced apart and having the confronting sockets 13, 13 therein of the shape of spherical segments. The clamps of each pair may be adjusted toward and from each other by clamp screws, as 14, each screw 14 being fitted through one clamp and having a threaded connection with the other clamp of that pair. Provision is thus made for the adjustment of the eye lid retractors, as will be more fully hereinafter explained.

Figure 6:
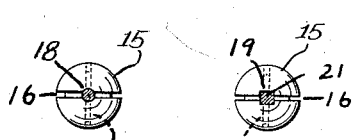
Figure 6 is a sectional view taken on the line 6—6 of Figure 4, and showing the retractor shaft round, in cross-section.
Figure 7:
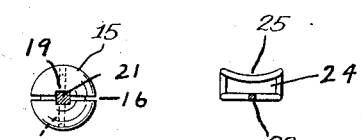
Figure 7 is a similar view showing the shaft square in cross-section.
Figure 8:
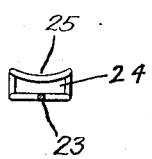
Figure 8 is a cross-sectional view taken on the line 8—8 of Figure 4.

The numeral 15 designates a spherical bearing, one of said bearings being located in the opposing sockets of each pair of clamps. Each bearing has a deep slot 16 extending from one side thereof and a deep slot 17, at right angles to the slot 16 and extending from the opposite side of the bearing. The spherical bearing 15 is therefore contractile. It has a round rod bearing, as 18, extended therethrough in the plane of both slots, as shown in Figure 6, or the rod bearing may be square, as shown in Figure 7.

There is a round adjusting rod 20 fitted through the bearing 18, or a square adjusting rod 21 fitted through the bearing 19. The outer ends of these rods have the knurled grips whereby the rods may be turned. In the form shown in Figure 6 the rod may be turned independently of the bearing 15 but in the form shown in Figure 7 the bearing 15 turns with the rod.

The ends of the rods opposite the grips 22 have sockets therein and secured in these sockets are the shanks 23 of the lid-retractors proper. The free ends of these shanks are turned slightly inwardly toward the eye of the patient and are formed with the retracted, hook shaped eyes 24 which are formed with the outwardly curved, lid engaging, cross bars 25 adapted to engage with the inner side of the lid of the eye to which it is applied.

In Figure 2 the lid-retractors are shown as applied to the lids of one eye and said lids retracted and are shown as applied to the other eye to hold the lids away from the eye ball but said lids not being retracted.

In use the speculum may be applied to the face of the patient and adjusted to fit the face contour and the bows 8 adjusted to, and fitted behind, the ears of the patient so as to hold the face mask in firm position on the face. The retractors may then be adjusted to the desired position and engaged under the lids of the eye to be treated. While this is being done the set screws 14 should be released so that the bearings 15 may freely move to permit the free adjustment of the retractors and said retractors may then be adjusted longitudinally relative to the bearings 15 and tilted in any direction and to any degree desired by the operator and the set screws 14 then tightened up to contract the bearings 15 to cause them to firmly grip the rods 20 so as to hold the retractors in any selected position.

It is, of course, contemplated that mechanical changes may be made in the construction of the speculum. For example, the set screws 14 may be threaded through one of the corresponding clamp jaws with their inner ends clamping directly against the corresponding bearing 15. Also different sizes of retractors may be used depending on the patient and for this reason the grips 22 are removably secured on the rods 20 so that, when removed, the rods may be easily removed from the bearings 15 and other retractors substituted; also the retractor shanks 23 may be welded, or otherwise secured, to the rods.

The speculum should be made entirely of non-magnetic material so as not to be affected by a magnetic instrument should the same be used by the operator.

In general the drawings and description are illustrative merely while the broad principle of the invention will be defined by the appended claims.

What I claim is:

1. An eyelid speculum comprising, a face mask composed of side pieces of a general arcuate shape and curved to conform to the contour of the human face, said side pieces being connected together at the top to be relatively adjusted on a vertical axis and forming a forehead portion adapted to fit closely against the forehead of the patient, means for maintaining said side pieces at any point of adjustment, said side pieces being adapted to surround the respective eyes and to fit closely against the sides of the face and having free ends which rest against the cheeks of the patient, means on the mask for selectively engaging the eyelids and adjustable to move the engaged lid to the desired position relative to the eye ball and means for securing the lid-engaging means at a selected position of adjustment.

2. An eye lid speculum comprising, a face mask composed of side pieces of a general arcuate shape and curved to conform to the contour of the human face, said side pieces being connected together at the top forming a forehead portion which is adjustable on a vertical axis and shaped to fit closely against the forehead of the patient, said side pieces being shaped to surround the respective eyes and to fit closely against the sides of the face and having free ends which rest against the cheeks of the patient, means on the mask for selectively engaging the eyelids, universal connections between the lid-engaging means and the mask, said lid-engaging means also being longitudinally adjustable on the mask to move the engaged lid to the desired position relative to the eye ball and means for securing the lid-engaging means at a selected position of adjustment.

3. An eyelid speculum comprising, a face mask composed of side pieces of a general arcuate shape and curved to conform to the contour of the human face, said side pieces being hinged together at the top and forming a forehead portion which is adjustable on a vertical axis and shaped to fit closely against the forehead of the patient, said side pieces being shaped to surround the respective eyes and to fit closely against the sides of the face and having free ends positioned to rest against the cheeks of the patient, means for maintaining said side pieces in a selected adjusted position, clamps on the mask, contractile spherical bearings on the clamps, eyelid retractors slidable through the bearings, means for adjusting the clamps into gripping relation with the bearings to contract the bearings into gripping relation with the eye pieces.

4. An eyelid speculum comprising, a face mask composed of side pieces of a general arcuate shape and curved to conform to the contour of the human face, said pieces being hinged together at the top and forming a forehead portion which is adjustable on a vertical axis and which is shaped to fit closely against the forehead of the patient, means for maintaining said side pieces in a selected adjusted position, said side pieces being shaped to surround the respective eyes and to fit closely against the sides of the face and having free ends which rest against the cheeks of the patient, clamps on the mask, contractile spherical bearings in the clamps, eyelid retractors engageable with the eyelids of the patient and having extended shanks which extend through said bearings, means for adjusting the clamps to cause them to grip and contract the bearings into gripping relation with said shanks or to release the bearings to allow adjustment of the retractors.

SEELEY T. PULLIAM.

REFERENCES CITED

The following references are of record in the file of this patent:

UNITED STATES PATENTS

| Number | Name | Date |
|---|---|---|
| 1,375,445 | Crossley | Apr. 19, 1921 |
| 2,328,135 | Gack | Aug. 31, 1943 |
| 2,345,299 | Shipley | Mar. 28, 1944 |
| 1,855,558 | Payne | Apr. 26, 1932 |
| 1,863,309 | Kitts | June 14, 1932 |
| 2,406,190 | Burdick | Aug. 20, 1946 |